(12) United States Patent
Monroe et al.

(10) Patent No.: US 7,411,187 B2
(45) Date of Patent: Aug. 12, 2008

(54) ION TRAP IN A SEMICONDUCTOR CHIP

(75) Inventors: Christopher Monroe, Ann Arbor, MI (US); Daniel Stick, Ann Arbor, MI (US); Martin Madsen, Ann Arbor, MI (US); Winfried Hensinger, Ann Arbor, MI (US); Keith Schwab, Ithaca, NY (US)

(73) Assignee: The Regents of the University of Michigan, Ann Arbor, MI (US)

( * ) Notice: Subject to any disclaimer, the term of this patent is extended or adjusted under 35 U.S.C. 154(b) by 256 days.

(21) Appl. No.: 11/419,955

(22) Filed: May 23, 2006

(65) Prior Publication Data
US 2007/0040113 A1 Feb. 22, 2007

Related U.S. Application Data

(60) Provisional application No. 60/683,559, filed on May 23, 2005.

(51) Int. Cl.
*B01D 59/44* (2006.01)

(52) U.S. Cl. .................. 250/290; 250/281; 250/282; 250/283; 250/288; 250/214 R; 250/207; 257/14; 257/12; 257/13; 257/15; 257/17; 257/31; 257/33; 703/11; 708/403; 708/191; 700/1; 706/14; 706/12; 706/45; 709/201; 435/6; 435/287.2; 712/34

(58) Field of Classification Search .......... 250/290, 250/281, 282, 283, 288, 214 R, 207; 257/14, 257/12, 13, 15, 17, 31, 33; 703/11; 708/403, 708/191; 700/1; 706/14, 12, 45; 709/201; 435/6, 287.2; 712/34
See application file for complete search history.

(56) References Cited

U.S. PATENT DOCUMENTS

| | | | |
|---|---|---|---|
| 4,749,904 | A | 6/1988 | Vasterink |
| 5,028,837 | A | 7/1991 | Kolpin |
| 5,248,883 | A | 9/1993 | Brewer et al. |
| 5,379,000 | A | 1/1995 | Brewer et al. |

(Continued)

OTHER PUBLICATIONS

Author Unknown, "Trapped ion quantum computers," retrieved from http://en.wikipedi.org/wiki/Trapped_ion_quantum_computers, on May 3, 2006, pp. 1-4.
W.K. Hensinger et al., "MEMS Fabrication of Silicon Ion Trap Arrays," date unknown, 1 page.

(Continued)

*Primary Examiner*—Jack I. Berman
*Assistant Examiner*—Meenakshi S Sahu
(74) *Attorney, Agent, or Firm*—Howard & Howard Attorneys, P.C.

(57) ABSTRACT

A micrometer-scale ion trap, fabricated on a monolithic chip using semiconductor micro-electromechanical systems (MEMS) technology. A single 111Cd+ ion is confined, laser cooled, and the heating measured in an integrated radiofrequency trap etched from a doped gallium arsenide (GaAs) heterostructure. Single 111Cd+ qubit ions are confined in a radiofrequency linear ion trap on a semiconductor chip by applying a combination of static and oscillating electric potentials to integrated electrodes. The electrodes are lithographically patterned from a monolithic semiconductor substrate, eliminating the need for manual assembly and alignment of individual electrodes. The scaling of this structure to hundreds or thousands of electrodes is possible with existing semiconductor fabrication technology.

67 Claims, 6 Drawing Sheets

U.S. PATENT DOCUMENTS

| | | | |
|---|---|---|---|
| 5,633,497 | A | 5/1997 | Brittain et al. |
| 6,469,298 | B1 | 10/2002 | Ramsey et al. |
| 6,489,609 | B1 | 12/2002 | Baba et al. |
| 6,566,651 | B2 | 5/2003 | Baba et al. |
| 6,762,406 | B2 | 7/2004 | Cooks et al. |
| 6,777,673 | B2 | 8/2004 | Chang et al. |
| 6,870,158 | B1 | 3/2005 | Blain |
| 6,870,159 | B2 | 3/2005 | Kawato |
| 6,933,498 | B1 | 8/2005 | Whitten et al. |
| 7,012,250 | B1 | 3/2006 | Aksyuk et al. |
| 7,208,729 | B2 * | 4/2007 | Syms ........................ 250/288 |
| 2003/0052264 | A1 | 3/2003 | Baba et al. |
| 2003/0089846 | A1 | 5/2003 | Cooks et al. |
| 2003/0122070 | A1 | 7/2003 | Chang et al. |
| 2004/0155183 | A1 | 8/2004 | Kawato |
| 2005/0040327 | A1 | 2/2005 | Lee et al. |
| 2005/0263698 | A1 | 12/2005 | Kawato |

OTHER PUBLICATIONS

Author Unknown, "U-M develops scalable and mass- producible quantum computer chip," University Of Michigan News Service, Dec. 12, 2005, pp. 1-2.

Belle Dumé, "Ions trapped on a chip," retrieved from http://www.physicweb.org/articles/news/9/12/10/1, on Dec. 2005, pp. 1-2.

D. Stick et al., "Ion Trap in a Semiconductor Chip," date unknown, pp. 1-5.

John Hudson, "Spin Doctors Create Quantum Chip," retrieved from http://www.wired.com/news/technology/1,70001-0.html, on May 3, 2006, pp. 1-3.

W.K. Hensinger et al., "MEMS Fabrication of Silicon Ion Trap Arrays," date unknown, 1-page.

Author Unknown, "Debye-Waller factor," Wikipedia, retrieved from http://en.wikipedi.org/wiki/Debye-Waller_factor, on May 4, 2006, 1-page.

Author Unknown, "Coulomb's law," Wikipedia, retrieved from http://en.wikipedi.org/wiki/Coulomb%27s_constant, on May 4, 2006, pp. 1-4.

P.C. Haljan et al., Spin-Dependent Forces on Trapped Ions for Phase-Stable Quantum Gates and Entangled States of Spin and Motion, The American Physical Society, Physical Review Letters, Apr. 22, 2005, PRL 94, pp. 153602-1-153602-4.

B.B. Blinov et al., "Observation of entanglement between a single trapped atom and a single photon," Letters to Nature, Nature, vol. 428, Mar. 11, 2004, pp. 153-157.

Ashok Muthukrishnan et al., "Entanglement of internal and external angular momenta of a single atom," Institute of Physics Publishing, Journal of Optics B: Quantum and Semiclassical Optics, Mar. 1, 2002, pp. 873-877.

G.J. Milburn et al., "Ion trap quantum computing with warm ions", Jun. 3, 2000, pp. 1-12.

C. Monroe et al., "Scalable Entanglement of Trapped Ions", date unknown, pp. 1-14.

Özgur E. Mustecaploglu and L. You, Motional rotating-wave approximation for harmonically trapped particles, The American Physical Society, Physical Review A, vol. 65, Feb. 20, 2002, pp. 033412-1-033412-7.

D.J. Wineland et al., "Quantum information processing with trapped ions," Phil. Trans. R. Soc. Lond. A (2003) 361, pp. 1349-1361.

Giovanna Morigi et al., "Doppler cooling of a Coulomb crystal," The American Physical Society, Physical Review A, vol. 64, 2001, pp. 063407-1-063407-063407-16.

D.M. Meekhof, "Generation of Nonclassical Motional States of a Trapped Atom," The American Physical Society, Physical Review Letters, vol. 76, No. 11, Mar. 11, 1996, pp. 1796-1799.

G. Morigi et al., "Laser cooling of two trapped ions: Sideband cooling beyond the Lamb-Dicke limit," The American Physical Society, Physical Review A, vol. 59, No. 5, May 1999, pp. 3797-3807.

* cited by examiner

ION TRAP IN A SEMICONDUCTOR CHIP

CROSS-REFERENCE TO RELATED APPLICATION

The instant application claims priority to U.S. Provisional Patent Application Ser. No. 60/683,559, filed May 23, 2005, the entire specification of which is expressly incorporated herein by reference.

STATEMENT REGARDING FEDERALLY SPONSORED RESEARCH OR DEVELOPMENT

The invention was made with United States Government support under Contract No. W911NF-04-1-0234 from the Disruptive Technology Office (DTO), Army Research Office, and Grant No. 0245609 from the National Science Foundation, Information Technology Research Program. The Government has certain rights in this invention.

FIELD OF THE INVENTION

The invention relates generally to ion traps and more particularly to ion traps in semiconductor chips, and methods for making the same.

BACKGROUND OF THE INVENTION

Ions, or charged atomic particles, can be confined and suspended in free space using electromagnetic fields. Quantum bits ("qubits") are stored in stable electronic states of each ion, and quantum information can be processed and transferred through the collective quantized motion of the ions in the trap (e.g., interacting through the Coulomb force). Lasers are applied to induce coupling between the qubit states (e.g., for single qubit operations) or coupling between the internal qubit states and the external motional states (e.g., for entanglement between qubits).

Current ion trap research is largely driven by the quest to construct a quantum information processor, where qubits of information are stored in individual atomic ions and connected through a common interaction with a phonon or photon field. The fundamental experimental requirements for quantum processing have all been met with ion traps, including demonstrations of multi-qubit quantum gates and small algorithms.

The fundamental operations of a quantum computer have been demonstrated experimentally with high accuracy (or "high fidelity" in quantum computing language) in trapped ion systems, and a strategy has been developed for scaling the system to arbitrarily large number of qubits by shuttling ions in an array of ion traps. This makes trapped ion systems one of the most promising architectures for a scalable, universal quantum information processor, as well as for the development of miniature mass spectrometer arrays, compact atomic clocks. Work on miniaturizing electromagnetic traps to the micrometer scale promises even higher levels of control and reliability.

The considerations with respect to the construction and operation of a quantum information processor include the following.

The first consideration concerns qubits. Any two-level quantum system can form a qubit, and there are two ways to form a qubit using the electronic states of an ion. First, the use of two ground state hyperfine levels (these are called "hyperfine qubits"). Second, the use of a ground state level and an excited level (these are called the "optical qubits"). Hyperfine qubits are extremely long-lived (e.g., decay time on the order of thousands to millions of years) and phase/frequency stable (e.g., have traditionally been used for atomic frequency standards). Optical qubits are also relatively long-lived (e.g., decay time on the order of a second) compared to the logic gate operation time (e.g., on the order of microseconds). However, each type of qubit poses its own challenges in the laboratory.

The second consideration concerns initialization. Ions can be prepared in a specific qubit state using a process called optical pumping. A laser couples the ion to some excited states which eventually decays to one state which is not coupled to by the laser. Once the ion reaches that state, it has no excited levels to couple to in the presence of that laser and therefore remains in that state. If the ion somehow decays to one of the other states, the laser will continue to excite the ion until it decays to the state that does not interact with the laser. This initialization process is standard in many physics experiments and can be performed with extremely high fidelity (e.g., >99.9%).

The third consideration concerns measurement. Measuring the state of the qubit stored in an ion is quite simple. Typically, a laser is applied to the ion that couples only one of the qubit state. When the ion is collapsed into this state during the measurement process, the laser will excite it, resulting in a photon being released when the ion decays from the excited state. After decay, the ion is continually excited by the laser and repeatedly emitting photons. These photons can be collected by a photomultiplier tube ("PMT") or a charge-coupled device ("CCD") camera. If the ion is collapsed into the other qubit state, then it does not interact with the laser and no photon will be emitted. By counting the collected photons, it is easy to determine which state the ion is in with very high accuracy (e.g., >99.9%).

The fourth consideration concerns arbitrary single qubit rotation. One of the requirements of universal quantum computing is to coherently change the state of a single qubit. For example, this can transform a qubit starting out in 0 into any arbitrary superposition of 0 and 1 defined by the user. In trapped ion systems, this is often done using magnetic dipole transitions or stimulated Raman transitions for hyperfine qubits, and electric quadrupole transitions for optical qubits. Gate fidelity can be as high as >99%.

The fifth consideration concerns two qubit entangling gates. Besides the controlled-NOT gate, many equivalent but more robust schemes have been proposed and implemented experimentally. Recent theoretical work has shown that there are no fundamental limitations to the speed of entangling gates, but gates in this impulsive regime (e.g., faster than 1 microsecond) have not yet been demonstrated experimentally (e.g., current gate time is on the order of microseconds). The fidelity of these implementations have been as high as >97%.

The sixth consideration concerns scalable trap designs. Efforts in this area are now focused on the scaling of ion traps to host much larger numbers of qubits, perhaps by shuttling individual atoms through a complex maze of ion trap electrodes. For example, several groups have successfully fabricated ion traps with multiple trap regions and have shuttled ions between different trap zones. Thus, ions can be separated from the same interaction region to individual storage regions and brought back together without losing the quantum information stored in their internal states. Ions can also be made to turn corners at a "T" junction, allowing a two dimensional trap array design.

Although ions traps present a great deal of promise, especially with respect to quantum information processing and computing, they still must overcome significant manufacturing and scalability issues that have greatly limited their overall use and effectiveness.

Accordingly, there exists a need for new and improved ion traps and methods for making the same, especially those that are suitable for use in conjunction with quantum information processing and computing.

SUMMARY OF THE INVENTION

In accordance with the general teachings of the present invention, new and improved ion traps in semiconductor chips, and methods for making the same, are provided.

In accordance with a first embodiment of the present invention, an ion trap device is provided, comprising: a semiconductor chip, including: (1) a first substrate portion; (2) a first insulator layer disposed on the first substrate portion; (3) a first electrode layer disposed on the first insulator layer, wherein a first electrode system is formed on a surface thereof; (4) a second substrate portion spaced and opposed to the first substrate portion so as to define a first aperture formed therebetween; (5) a second insulator layer disposed on the second substrate portion spaced and opposed to the first insulator layer so as to define a second aperture formed therebetween; (6) a second electrode layer disposed on the second insulator layer, wherein a second electrode system is formed on a surface thereof, wherein the second electrode layer is spaced and opposed to the first electrode layer so as to define a third aperture formed therebetween; (7) a third insulator layer disposed on the first electrode layer; (8) a third electrode layer disposed on the third insulator layer, wherein a third electrode system is formed on a surface thereof; (9) a fourth insulator layer disposed on the second electrode layer spaced and opposed to the third insulator layer so as to define a fourth aperture formed therebetween; and (10) a fourth electrode layer disposed on the fourth insulator layer, wherein a fourth electrode system is formed on a surface thereof, wherein the fourth electrode layer is spaced and opposed to the third electrode layer so as to define a fifth aperture formed therebetween, wherein the first, second, third, fourth, and fifth apertures are substantially axially aligned so as to define the at least one ion trapping region selectively operable to receive at least one ion introduced therein, wherein the first, second, third and fourth electrode systems are selectively operable to form the ion trap in the ion trapping region when a voltage is selectively applied to the first, second, third and fourth electrode systems.

By "electrode system," as that term is used herein, it is meant at least three electrode members, either adjacent to and/or in proximity to another of the at least three electrode members, wherein an ion trapping region is selectively capable of being formed adjacent to and/or in proximity to a middle or central electrode member by selectively applying a potential (i.e., voltage) to any and/or all of the at least three electrode members, as will be described herein.

In one aspect of the present invention, the first and second substrate portions each include an angled wedge portion extending from a bottom surface to a top surface thereof, wherein the angled wedge portions are spaced and opposed to one another. The first, second, third and fourth electrode layers are in a cantilevered arrangement with the first, second, third and fourth insulator layers, respectively, wherein the cantilevered arrangements are in proximity to the at least one ion trapping region. The first and third electrode layers are in a cantilevered arrangement with the first substrate portion and the second and fourth electrode layers are in a cantilevered arrangement with the second substrate portion, wherein the cantilevered arrangements are in proximity to the at least one ion trapping region.

In another aspect of the present invention, the first electrode layer, second electrode layer, third electrode layer, fourth electrode layer or the substrate are comprised of gallium arsenide. The first, second, third or fourth insulator layers are comprised of aluminum gallium arsenide. A portion of the first, second, third or fourth electrode systems are comprised of a material selected from the gold, nickel, germanium, and combinations thereof. By way of a non-limiting example, the first, second, third or fourth electrode systems also can include gold/nickel/germanium bond pads disposed on a surface thereof to provide for electrical connections thereto.

In still another aspect of the present invention, a radiofrequency potential is applied to either the first, second, third or fourth electrode systems. The radiofrequency potential is in the range of about 1 to about 50 volts at a drive frequency in the range of about 1 to about 200 megahertz. A static potential is applied to either the first, second, third or fourth electrode systems. The static potential is in the range of about −10 to about +10 volts.

In still yet another aspect of the present invention, the at least one ion is loaded into the at least one ion trapping region by photoionization laser pulsing. The at least one ion loaded into the at least one ion trapping region is Doppler laser cooled.

In still a further aspect of the present invention, the third aperture formed between an end portion of the first electrode layer and an end portion of the second electrode layer has a length of about 10 to about 100 μm. The fifth aperture formed between an end portion of the third electrode layer and an end portion of the fourth electrode layer has a length of about 10 to about 100 μm. By way of a non-limiting example, the third and fifth apertures have an equidistant length.

In still yet another further aspect of the present invention, a radiofrequency potential is applied to either the first and fourth electrode systems or the second and third electrode systems, wherein the radiofrequency potential is in the range of about 1 to about 50 volts at a drive frequency in the range of about 1 to about 200 megahertz. A static potential is applied to either the first and fourth electrode systems or the second and third electrode systems, wherein the static potential is in the range of about −10 to about +10 volts. By way of a non-limiting example, a radiofrequency potential is applied to the first and fourth electrode systems and a static potential is applied to the second and third electrode systems, wherein the radiofrequency potential is in the range of about 1 to about 50 volts at a drive frequency in the range of about 1 to about 200 megahertz, and the static potential is in the range of about −10 to about +10 volts. By way of another non-limiting example, a radiofrequency potential is applied to the second and third electrode systems and a static potential is applied to the first and fourth electrode systems, wherein the radiofrequency potential is in the range of about 1 to about 50 volts at a drive frequency in the range of about 1 to about 200 megahertz, and the static potential is in the range of about −10 to about +10 volts.

The ion trap device of the present invention is intended to be operably associated with a computer, such as but not limited to a quantum computer.

In accordance with a first alternative embodiment of the present invention, a method of making an ion trap device is provided, comprising: (1) providing a substrate layer comprised of a conductive material; (2) disposing a first insulator layer on the substrate layer; (3) disposing a first membrane layer comprised of a conductive material on the first insulator layer; (4) disposing a second insulator layer on the first membrane layer; (5) disposing a second membrane layer on the second insulator layer; (6) back etching a bottom surface of the substrate layer to form a wedge portion defining a first substrate portion and a second spaced and opposed substrate portion, wherein a portion of a lower surface of the first insulator layer is exposed; (7) plasma etching a top surface of the second membrane layer and second insulating layer to expose a portion of the first membrane layer; (8) plasma etching a portion of the first and second membrane layers and first and second insulator layers to expose a top surface of the substrate layer; (9) disposing an electrical contact member on spaced and opposed locations of the first and second membrane layers and the substrate layer; (10) plasma etching through an axis of the first and second membrane layers and the first and second insulator layers to define first, second, third and fourth membrane portions and first, second, third and fourth insulator portions, wherein an area defining a second aperture is formed between spaced and opposed first and second insulator portions, wherein an area defining a third aperture is formed between spaced and opposed first and second membrane portions; wherein an area defining a fourth aperture is formed between spaced and opposed third and fourth insulator portions, and wherein an area defining a fifth aperture is formed between spaced and opposed third and fourth membrane portions; and (11) acid etching end portions of the first, second, third and fourth insulator portions such that the first, second, third and fourth membrane layers, respectively, are in a cantilever arrangement therewith.

By "membrane portion," as that term is used herein, it is meant at least three electrode members, either adjacent to and/or in proximity to another of the at least three electrode members, wherein an ion trapping region is selectively capable of being formed adjacent to and/or in proximity to a middle or central electrode member by selectively applying a potential (i.e., voltage) to any and/or all of the at least three electrode members, as will be described herein.

In another aspect of the present invention, the first, second, third, fourth, and fifth apertures are substantially axially aligned so as to define the at least one ion trapping region selectively operable to receive at least one ion introduced therein. Additionally, the first, second, third and fourth membrane portions are selectively operable to form the ion trap in the ion trapping region when a voltage is applied to the first, second, third and fourth membrane portions.

In another aspect of the present invention, the first and third membrane portions are in a cantilevered arrangement with the first substrate portion and the second and fourth membrane portions are in a cantilevered arrangement with the second substrate portion, wherein the cantilevered arrangements are in proximity to the at least one ion trapping region. Additionally, the first and second substrate portions each include an angled wedge portion extending from a bottom surface to a top surface thereof, wherein the angled wedge portions are spaced and opposed to one another.

In still another aspect of the present invention, the first membrane layer, second membrane layer, or the substrate are comprised of gallium arsenide. The first or second insulator layers are comprised of aluminum gallium arsenide. The electrical contact member is comprised of a material selected from the gold, nickel, germanium, and combinations thereof.

In still yet another aspect of the present invention, a radiofrequency potential is applied to either the first, second, third or fourth membrane portions (e.g., via wires connected to the electrical bond pads), wherein the radiofrequency potential is in the range of about 1 to about 50 volts at a drive frequency in the range of about 1 to about 200 megahertz. Additionally, a static potential is applied to either the first, second, third or fourth membrane portions, wherein the static potential is in the range of about −10 to about +10 volts.

In still a further aspect of the present invention, the at least one ion is loaded into the at least ion trapping region by photoionization laser pulsing. The at least one ion loaded into the at least one ion trapping region is Doppler laser cooled.

In still yet a further aspect of the present invention, the third aperture formed between an end portion of the first membrane portion and an end portion of the second membrane portion has a length of about 10 to about 100 μm. The fifth aperture formed between an end portion of the third membrane portion and an end portion of the fourth membrane portion has a length of about 10 to about 100 μm. By way of a non-limiting example, the third and fifth apertures have an equidistant length.

In still yet another further aspect of the present invention, a radiofrequency potential is applied to either the first and fourth membrane portions or the second and third membrane portions, wherein the radiofrequency potential is in the range of about 1 to about 50 volts at a drive frequency in the range of about 1 to about 200 megahertz. By way of a non-limiting example, a static potential is applied to either the first and fourth membrane portions or the second and third membrane portions, wherein the static potential is in the range of about −10 to about +10 volts. By way of another non-limiting example, a radiofrequency potential is applied to the first and fourth membrane portions and a static potential is applied to the second and third membrane portions, wherein the radiofrequency potential is in the range of about 1 to about 50 volts at a drive frequency in the range of about 1 to about 200 megahertz, and wherein the static potential is in the range of about −10 to about +10 volts. By way of still yet another non-limiting example, a radiofrequency potential is applied to the second and third membrane portions and a static potential is applied to the first and fourth membrane portions, wherein the radiofrequency potential is in the range of about 1 to about 50 volts at a drive frequency in the range of about 1 to about 200 megahertz, and wherein the static potential is in the range of about −10 to about +10 volts.

The ion trap device produced in accordance with the present invention is intended to be operably associated with a computer, such as but not limited to a quantum computer.

Further areas of applicability of the present invention will become apparent from the detailed description provided hereinafter. It should be understood that the detailed description and specific examples, while indicating the preferred embodiment of the invention, are intended for purposed of illustration only and are not intended to limit the scope of the invention.

BRIEF DESCRIPTION OF THE DRAWINGS

These and other features and advantages of the present invention will become more readily appreciated as the same becomes better understood by reference to the following detailed description when considered in connection with the accompanying drawings, wherein.

The same reference numerals refer to the same parts throughout the various Figures.

DETAILED DESCRIPTION OF THE INVENTION

The following description of the preferred embodiment(s) is merely exemplary in nature and is in no way intended to limit the invention, or uses.

A micrometer-scale ion trap, fabricated on a monolithic chip using semiconductor micro-electromechanical systems (MEMS) technology, is provided. The present invention confines, allows for laser cooling, laser cools, and measures heating of a single 111Cd+ ion in an integrated radiofrequency trap etched from a doped gallium arsenide (GaAs) heterostructure. Compared with "chip traps" for confining neutral atoms, ion traps of the present invention with similar dimensions and power dissipation offer much higher confinement forces and allow unparalleled control at the single-atom level.

More specifically, the present invention confines single 111Cd+ qubit ions in a radiofrequency linear ion trap on a semiconductor chip by applying a combination of static and oscillating electric potentials to integrated electrodes. By way of a non-limiting example, oscillating electric potentials are applied to the top electrodes on one side of an aperture and to the bottom electrodes on the other side of the aperture. The remaining electrodes are grounded with respect to the oscillating voltages using capacitors. The oscillating voltages produce a confining potential along a line that is in the center of the four electrode systems and/or membrane portions, as previously described. Static voltages (e.g., much lower frequency than the frequency of the oscillating voltage) are applied to the remaining electrodes to confine the ion at a single point along this line.

The electrodes are lithographically patterned from a monolithic semiconductor substrate, eliminating the need for manual assembly and alignment of individual electrodes. The scaling of this structure to hundreds or thousands of electrodes is possible with existing semiconductor fabrication technology.

Candidate linear ion trap geometries amenable to microfabrication include: (i) symmetric high-aspect-ratio multilayer structures with electrodes surrounding the ions; and (ii) asymmetric planar structures with the ions residing above a planar array of electrodes. The symmetric geometry demonstrated herein may be more difficult to fabricate than the asymmetric geometry, but it is deeper, has better optical access, and is less sensitive to electric field noise from correlated potentials on the electrodes (e.g., applied voltage noise or radiofrequency thermal fields common to the electrodes. A symmetric ion trap fabricated from silicon electrodes has been previously demonstrated, requiring manual assembly and alignment of separated electrode sections. In contrast, the present invention provides an integrated ion trap fashioned from a monolithic microchip that does not require assembly and is therefore suitable for miniaturization and scaling.

Figure 1A:
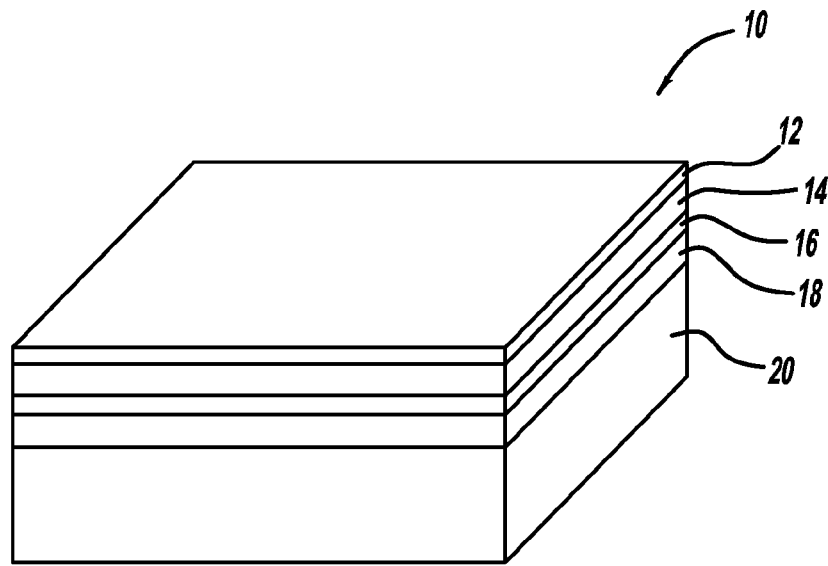
FIG. 1a is a schematic view of a fabrication process for a semiconductor chip ion trap, wherein the structure grown by molecular beam epitaxy consists of alternating GaAs/AlGaAs membrane layers on a GaAs substrate, in accordance with a first embodiment of the present invention.

Referring specifically to FIG. 1a, there is shown a schematic view of a fabrication process for an ion trap semiconductor chip 10 of the present invention, wherein the structure, e.g., grown by molecular beam epitaxy, consists of alternating gallium arsenide/aluminum gallium arsenide membrane layers on a gallium arsenide substrate. It should be appreciated that any conventional semiconductor material is suitable for use with the present invention, with appropriate conductors (e.g., doped silicon or deposited metal surfaces) and insulators (e.g., silicon oxide, silicon nitride, and/or the like). One specific advantage of gallium arsenide and aluminum gallium arsenide is that it is relatively easy to produce alternating thin layers of these materials through molecular beam epitaxy, and etch these materials with various reagents. Additionally, aluminum gallium arsenide can be selectively etched in order to fabricate a backside etch and remove some of the insulting layer (as will be described herein in detail). However, these types of structures are now available in silicon-based systems. Another important advantage of the present invention is that the respective materials can be etched using a process that is easily scalable to produce many more electrodes, e.g., exactly like the scaling of a single transistor to millions of them on the same device. This scalability is provided with the use of techniques such as photolithography and reactive plasma ion etching.

In accordance with one aspect of the present invention, the ion trap semiconductor chip 10 is fabricated from four alternating layers 12, 14, 16, 18, respectively, of aluminum gallium arsenide (hereinafter referred to as "AlGaAs") (i.e., layers 14 and 18) and gallium arsenide (hereinafter referred to as "GaAs") (i.e., layers 12 and 16) epitaxially grown on a GaAs substrate 20, as described herein and generally illustrated in FIGS. 1a-f and 2a-b. The GaAs layers 12 and 16 are shown having a thickness of about 2.3 μm, however, it should be appreciated that these layers can be either thicker than or thinner than this. By way of a non-limiting example, the thickness of the GaAs layers can be in the range of about 1 to about 10 μm. The AlGaAs layers 14 and 18 are shown having a thickness of about 4 μm, however, it should be appreciated that these layers can be either thicker than or thinner than this. Additionally, the relative concentrations of Al to Ga to As is 0.7:0.3:1, respectively. It should be appreciated that this ratio can be changed, so long as it remains suitable as an insulator and is still suitable for selective etching. By way of a non-limiting example, the thickness of the AlGaAs layers can be in the range of about 1 to about 20 μm. The GaAs substrate 20 is shown having a thickness of about 200 μm, however, it should be appreciated that this substrate can be either thicker than or thinner than this. By way of a non-limiting example, the thickness of the GaAs substrate can be in the range of about 100 to about 600 μm.

By way of a non-limiting example, the two GaAs layers 12, 16, respectively, are highly doped (e.g., $\sim 3 \times 10^{18}$ e/cm$^3$, with an acceptable operational range of about $1 \times 10^{18}$ to about $4 \times 10^{18}$ e/cm$^3$) and eventually formed into cantilevered electrodes surrounding the free-space trap region, as will be described herein. A through-hole is also eventually etched in the substrate allowing clear optical access, as will also be described herein.

Figure 1B:
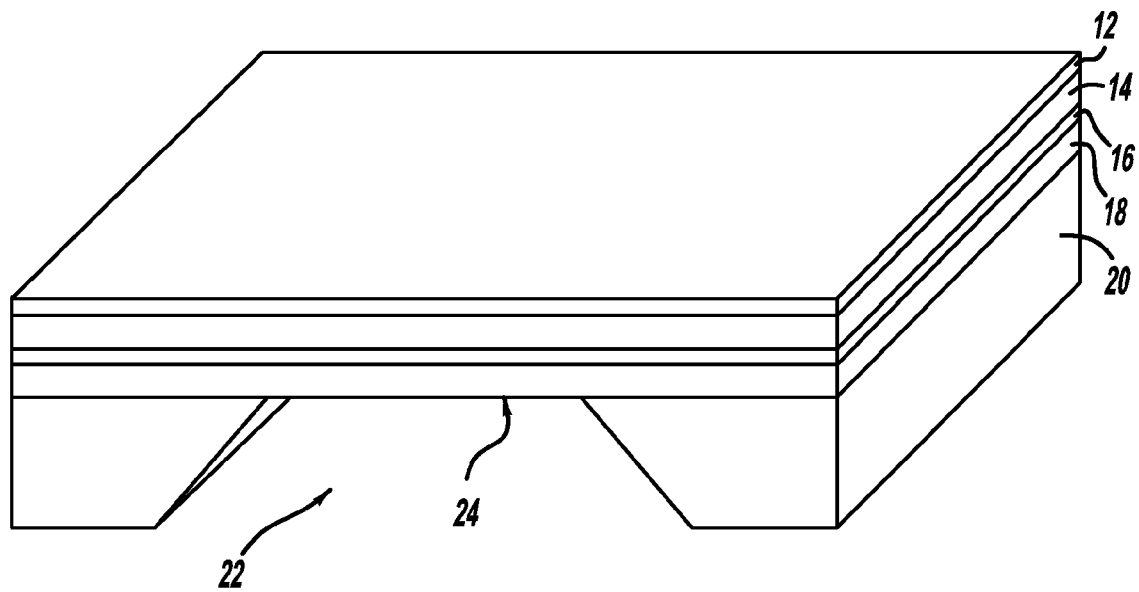
FIG. 1b is a schematic view of the fabrication process for a semiconductor chip ion trap depicted in FIG. 1a, wherein the backside etch removes substrate material for clear optical access through the chip, in accordance with a first embodiment of the present invention.

Referring specifically to FIG. 1b, there is shown a schematic view of the fabrication process for the ion trap semiconductor chip 10 of the present invention wherein a backside etch process removes substrate material for clear optical access through the ion trap semiconductor chip 10, thus forming an area defining a wedge 22, and exposing a portion 24 of the AlGaAs layer 18. By way of a non-limiting example, this backside etch was performed chemically using a two part process. Initially, a sulfuric acid/hydrogen peroxide solution (e.g., 5:4:1 volume ratio of concentrated hydrogen peroxide to water to concentrated sulfuric acid) removes the bulk of the substrate material. This can be done at a temperature of 80° C. to speed up the etch process. Second, a citric acid/hydrogen peroxide (e.g., 2.5:1 volume ratio of 50% mass citric acid to concentrated hydrogen peroxide) etch removed the remaining substrate and selectively stops on the AlGaAs layer 18. An alternative method to creating this backside etch would have been to use a deep reactive ion etcher. The photoresist used here and in subsequent steps is OIR 908-35 (Arch Chemicals, Inc., Portsmouth, N.H.).

Figure 1C:
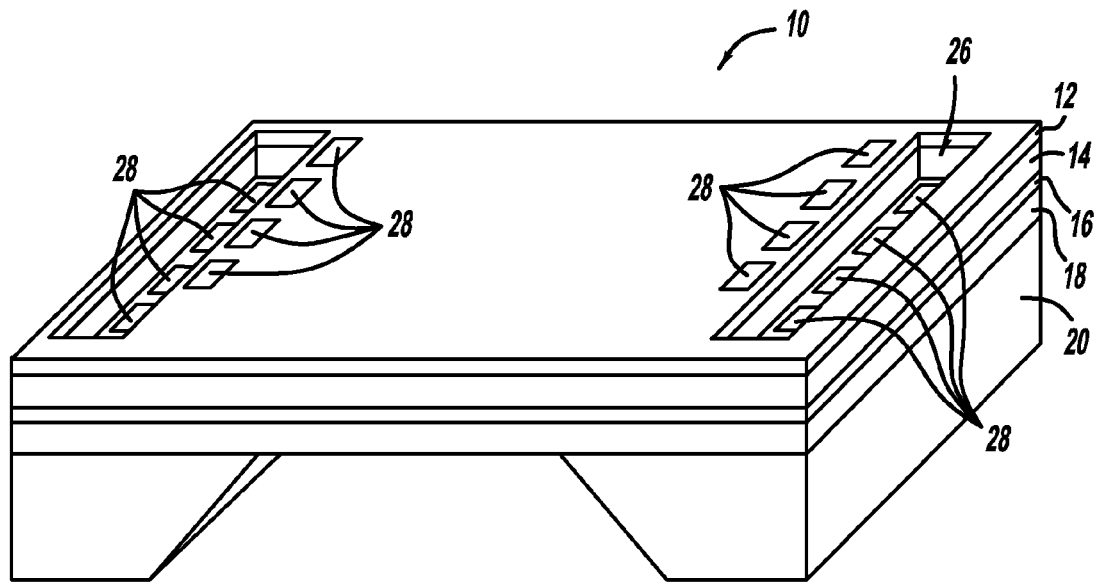
FIG. 1c is a schematic view of the fabrication process for a semiconductor chip ion trap depicted in FIGS. 1a-b, wherein the inductively-coupled plasma etch through membrane creates access to submerged GaAs layers, and gold/germanium/nickel bond pads are deposited for electrical contacts to the trap electrodes, in accordance with a first embodiment of the present invention.

Referring specifically to FIG. 1c, there is shown a schematic view of the fabrication process for the ion trap semiconductor chip 10 of the present invention, wherein an inductively-coupled plasma etch process through membrane creates access to submerged portions 26 of the GaAs layers, 12 and 16, respectively, and gold/germanium/nickel (e.g., other acceptable materials include, without limitation, titanium) bond pads 28 are deposited for electrical contacts to the ion trap electrodes 30, 32, 34, 36, 38, 40, 42, 44, 46, 48, 50, 52, 54, 56, 58, and 60, respectively. The bond pad etching was performed in an inductively coupled plasma etcher, e.g., a PlasmaTherm, Inc. (St. Petersburg, Fla.) SLR series. The etching time was determined by the etching rate as the power used. The metal deposition was performed in an electron beam evaporator, model CHA Mark 40 (CHA Industries, Inc., Fremont, Calif.), laying down 150 angstroms of Ge, 400 angstroms of Au, 300 angstroms of Ni, and 3000 angstroms of Au. Afterward, the bond pad was annealed at a temperature of up to 450° C. for 2 minutes.

The electrodes 30, 32, 34, 36, 38, 40, 42, 44, 46, 48, 50, 52, 54, 56, 58, and 60, respectively, are electrically isolated from each other and from the doped GaAs substrate 20 by the interleaved AlGaAs layers (e.g., thickness or height (also referred to as "h") of 4 μm) 14 and 18, respectively. These insulating layers are then undercut ~15 μm from the tips of the GaAs cantilever portions 30a, 32a, 34a, 36a, 38a, 40a, 42a, 44a, 46a, 48a, 50a, 52a, 54a, 56a, 58a, and 60a, respectively, to shield the trapped ion from stray charge on the exposed insulator, as will be described herein. The electrodes 30, 32, 34, 36, 38, 40, 42, 44, 46, 48, 50, 52, 54, 56, 58, and 60, respectively, are segmented along the axis of the linear ion trap, as will also be described herein.

Figure 1D:
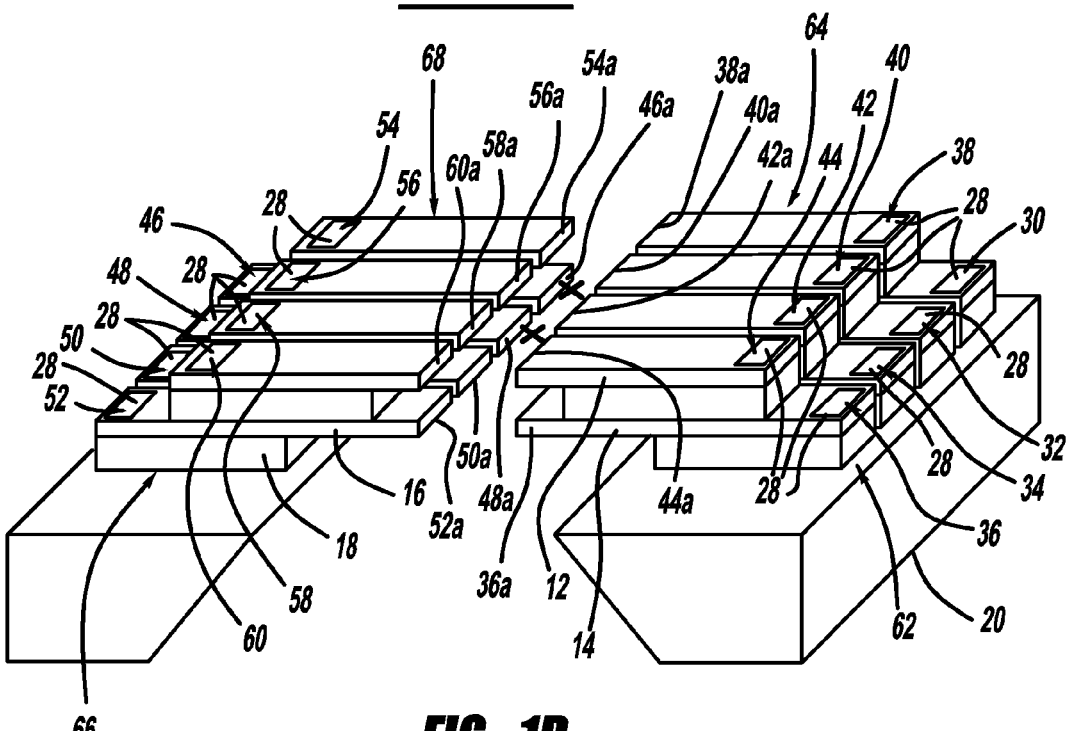
FIG. 1d is a schematic view of the fabrication process for a semiconductor chip ion trap depicted in FIGS. 1a-c, wherein a further inductively-coupled plasma etch through the membrane defines and isolates the cantilevered electrodes and a hydrofluoric acid etch undercuts the AlGaAs insulator material between the electrodes, in accordance with a first embodiment of the present invention.
Figure 1E:
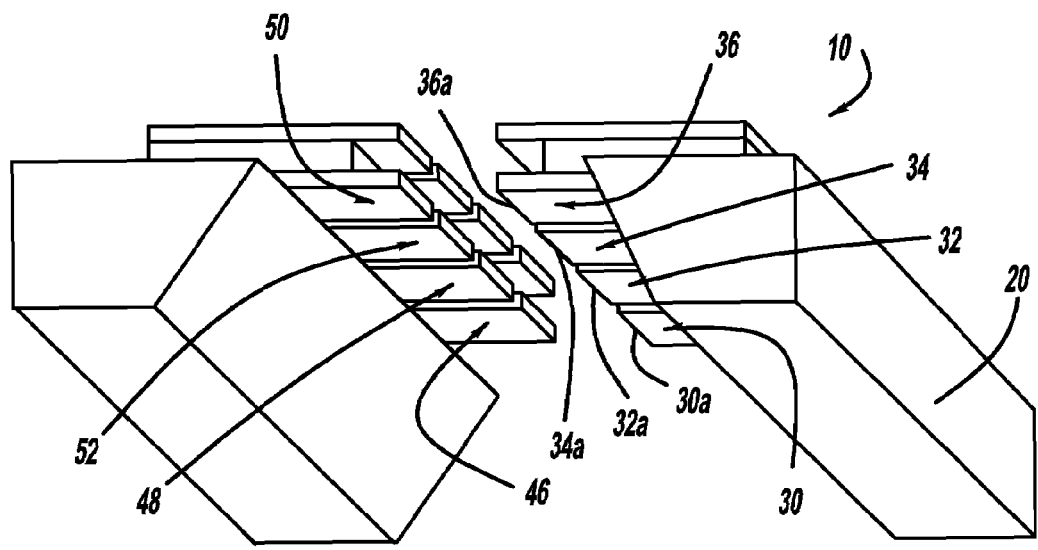
FIG. 1e is a bottom perspective view of a semiconductor chip ion trap depicted in FIG. 1d, in accordance with a first embodiment of the present invention.
Figure 1F:
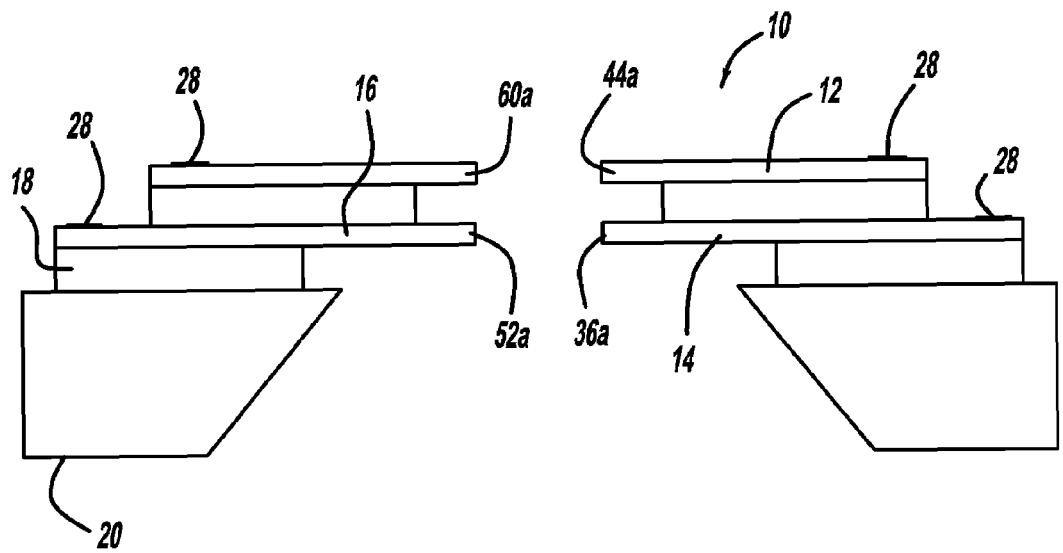
FIG. 1f is a sectional view of a semiconductor chip ion trap depicted in FIG. 1d, in accordance with a first embodiment of the present invention.

Referring specifically to FIG. 1d, there is shown a schematic view of the fabrication process for the ion trap semiconductor chip 10 of the present invention, wherein a further inductively-coupled plasma etch through the membrane defines and isolates the cantilevered electrodes, 30, 32, 34, 36, 38, 40, 42, 44, 46, 48, 50, 52, 54, 56, 58, and 60, respectively, and a hydrofluoric acid etch undercuts the AlGaAs insulator material between the electrodes, 30, 32, 34, 36, 38, 40, 42, 44, 46, 48, 50, 52, 54, 56, 58, and 60, respectively, e.g., through both AlGaAs layers 14 and 18, respectively. By way of a non-limiting example, the sample was submerged in concentrated HF for up to 1.5 minutes to achieve the 15 micron undercut. As shown, these insulating layers (i.e., AlGaAs layers 14 and 18, respectively) are then undercut (via the same process as described above) ~15 μm (or in a range of about 5 to about 50 μm) from the tips of the GaAs cantilever portions 30a, 32a, 34a, 36a, 38a, 40a, 42a, 44a, 46a, 48a, 50a, 52a, 54a, 56a, 58a, and 60a, respectively, to shield the trapped ion from stray charge on the exposed insulator. The electrodes 30, 32, 34, 36, 38, 40, 42, 44, 46, 48, 50, 52, 54, 56, 58, and 60, respectively, are thus segmented along the axis of the linear ion trap. Other views of the completed ion trap semiconductor chip 10 of the present invention are shown in FIGS. 1e-f.

By way of a non-limiting example, each of the four electrode segments 62, 64, 66, 68, respectively, has an axial width (also referred to as "w") of 130 μm (or a range of about 40 to about 300 μm) and is separated from adjacent segments by a 25 μm (or in a range of about 5 to about 40 μm) gap. The tip-to-tip separation (also referred to as "s") between opposing cantilevers in the plane of the chip is 60 μm (or in a range of about 20 to about 100 μm).

By way of a non-limiting example, a radiofrequency potential (e.g., in the range of about 1 to about 50 volts at a drive frequency in the range of about 1 to about 200 megahertz) is then applied to all axial segments (e.g., bond pads 38, 40, 42, 44, 46, 48, 50 and 52, and their associated electrodes) of the top GaAs cantilevers on one side of the ion trap and bottom cantilevers on the opposite side. Static potentials (e.g., in the range of about −10 to about +10 volts) are also then applied to the other cantilevers, which are held near radiofrequency ground with on-board filters (not shown), for example, bond pads 30, 32, 34, 36, 54, 56, 58, and 60 and their associated electrodes. Ions can be trapped in one of two zones (e.g., see the areas marked with an "X" in FIG. 1d) with appropriate static potentials applied to the four electrode segments 62, 64, 66, 68, respectively. Each of the local ion trap zones is primarily controlled by three adjacent segments, i.e., two endcap segments surrounding a center segment nearest to the ion. By way of a non-limiting example, the ion traps "X" are meant to be located in the space between the cantilevered electrodes, i.e., one ion trap is centered between the tips of the GaAs cantilever portions 58a, 50a, 42a, and 34a; and the other ion trap is centered between the tips of the GaAs cantilever portions 56a, 48a, 40a, and 32a). Without being bound to a particular theory of the operation of the present invention, it is believed that mechanical resonances of the cantilevers are expected to occur in the 1-10 MHz range, with quality factors expected to be of order $10^3$.

Figure 2A:
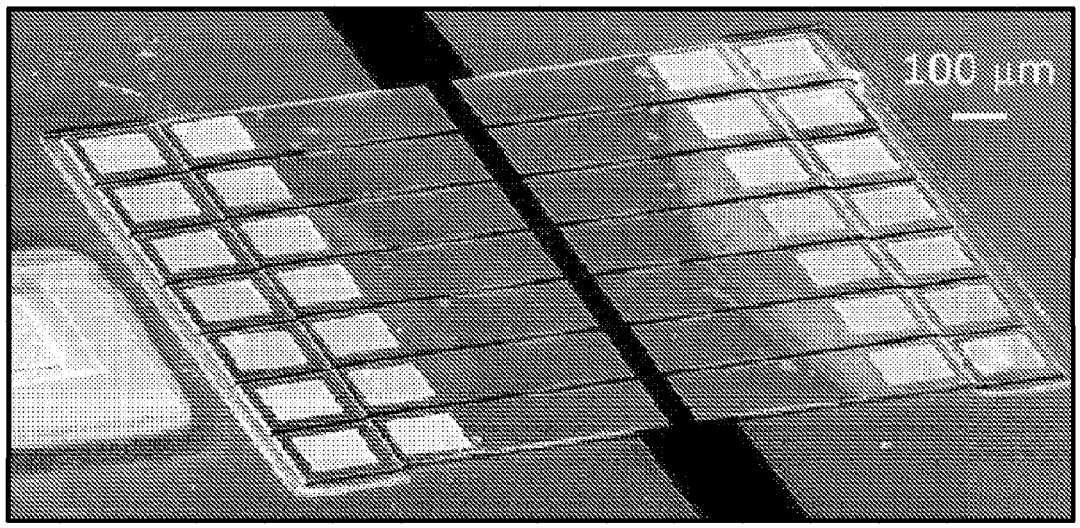
FIG. 2a is a scanning electron microscope image of a monolithic GaAs semiconductor linear ion trap wherein a semiconductor chip ion trap is shown with seven axial segments (i.e., 28 electrodes) cantilevered over a rectangular through-hole (i.e., the black area), in accordance with a first alternative embodiment of the present invention.

Referring specifically to FIG. 2a, there is shown a scanning electron microscope image of a monolithic GaAs semiconductor linear ion trap of the present invention, wherein an ion trap semiconductor chip is shown with seven axial segments (e.g., 28 total electrodes) cantilevered over a rectangular through-hole (e.g., the black area). It should be appreciated that less than or more than this number of axial segments can be employed in the practice of the present invention. The 28 bonding pads, in this case comprised of gold, germanium, and/or nickel, are visible as bright squares, along with a single bond pad at the left connecting to the substrate beneath. In accordance with one aspect of the present invention, ions were trapped in a similar structure with four segments instead of seven. As previously noted, the tip-to-tip separation s of electrodes across the gap was 60 μm.

Figure 2B:
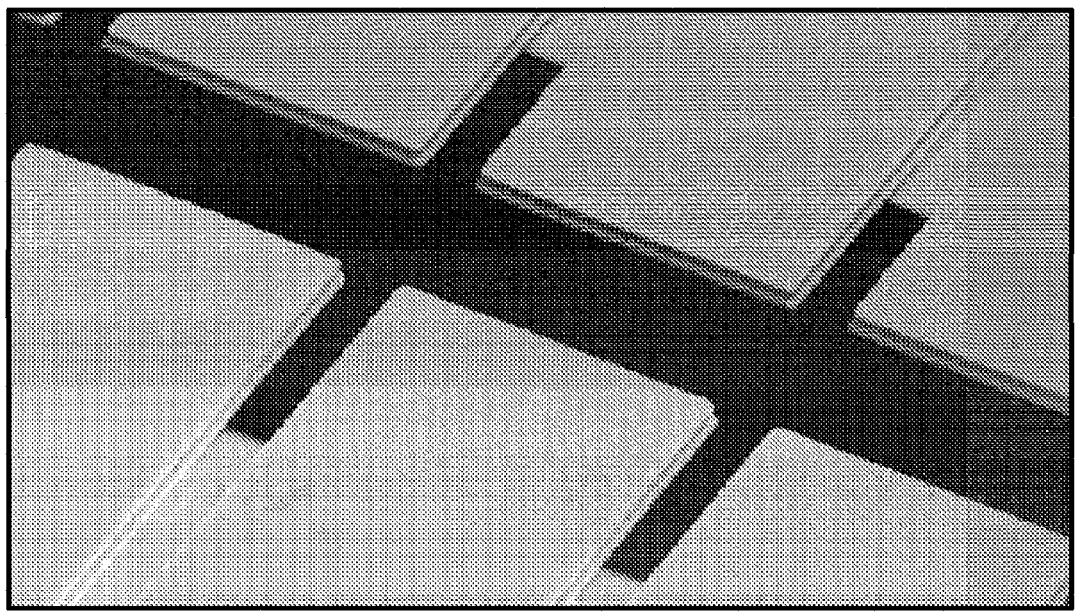
FIG. 2b is a scanning electron microscope image of a close up of a single ion trap segment depicted in FIG. 2a, clearly showing the upper and lower GaAs layers separated by h=4 µm, in accordance with a first alternative embodiment of the present invention.

Referring specifically to FIG. 2b, there is shown a scanning electron microscope image of close up of a single ion trap segment of the present invention, clearly showing the upper and lower GaAs layers separated by a height h of 4 μm. The scanning electron microscope used to obtain these images was a Model 6500 manufactured by JEOL USA, Inc. (Peabody, Mass.).

Ovens comprising ceramic tubes with tungsten wire coiled around them containing cadmium oxide were heated by running about 1 amp of current to produce a vapor of cadmium in the trapping region with an estimated partial pressure of $\sim 10^{-11}$ torr. The cadmium atoms were photoionized by directing laser pulses using a fabricated pulsed Ti-Sapphire laser (e.g., ~100 fs pulse duration at 80 MHz repetition rate) into the trapping region that were tuned near the neutral cadmium $^1S_0 \rightarrow {}^1P_1$ transition at 228.5 nm with about 1 mW of average power focused down to a ~20 μm waist. The 111Cd+ isotopes were selectively loaded and Doppler laser-cooled by adding a continuous-wave laser (e.g., using an MBR 110 Ti-Sapphire laser from Coherent, Inc. (Santa Clara, Calif.)) that was red-tuned within one natural linewidth of the 111Cd+ $^2S_{1/2} \rightarrow {}^2P_{3/2}$ transition near 214.5 nm (e.g., all other Cd+ isotopes were Doppler heated). The Doppler-cooling laser had up to 1 mW of power focused down to a ~15 μm waist. With both beams aligned, a single 111Cd+ ion was loaded after a few seconds, after which time the photoionization laser was blocked. The ion was imaged with a charge-coupled-device camera (Princeton Instruments, Inc. (Trenton, N.J.)) to a nearly diffraction-limited spot with f/2.1 optics, where f is the focal length, as shown in FIG. 3.

Figure 3:
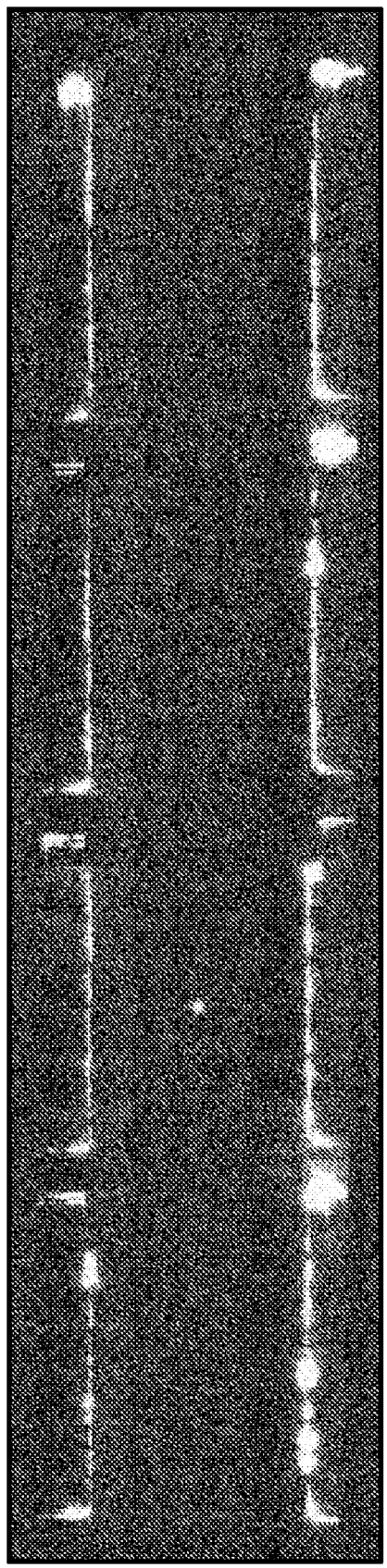
FIG. 3 is a photographic view of a single trapped Cd+ ion along a view perpendicular to the semiconductor chip plane after ~1 s of integration, in accordance with a second alternative embodiment of the present invention.

Referring specifically to FIG. 3, there is shown a photographic view of a single trapped Cd+ ion along a view perpendicular to the semiconductor chip plane after ~1 s of integration. The ion fluoresced from applied laser radiation directed through the chip at a 45° angle and was nearly resonant with the Cd+ $^2S_{1/2}$-$^2P_{3/2}$ electronic transition at a wavelength of 214.5 nm. The fluorescence was imaged onto a standard charge-coupled-device camera (Roper Scientific, Inc., a segment Roper Industries, Inc., (Duluth, Ga.)) with an f/2.1 objective lens, resulting in a near-diffraction-limited spot with ~1 μm resolution at the ion. The profile of the electrodes was also clearly visible as scattered radiation from a deliberately misaligned laser that struck the ion trap electrodes. As previously noted, the vertical gap between the top and bottom set of electrodes was s=60 μm.

Storage lifetimes in excess of 1 hour were observed, and a histogram of many loads showed an exponentially-distributed confinement time with a mean lifetime of 10 minutes when the ion was continuously Doppler-cooled.

The frequency of small oscillations of the trapped ion was directly measured by applying a weak, variable frequency potential to one of the electrodes and observing changes in the ion fluorescence owing to the resonant force while it was continuously laser-cooled. For an applied radiofrequency potential amplitude of $V_0$=8.0 V at a drive frequency of $\Omega T/2\pi$=15.9 MHz (see below), and static potentials of 1.00 V on the endcap electrodes and 0.33 V on the center electrodes, the axial secular frequency was measured to be $\omega z/2\pi$=1.0 MHz. The measured transverse secular frequencies were $\omega x/2\pi$=3.3 MHz and $\omega y/2\pi$=4.3 MHz, indicating a radiofrequency trap stability factor of q=0.62. These measurements were consistent with a 3-dimensional numerical simulation of the trapping potential, which further indicates that one of the transverse principal axes of the ion trap was rotated ~40° out of the plane of the chip. This is significant because it allows for Doppler laser cooling of all motional components of the ion Microscale ion traps were expected to be particularly sensitive to noisy potentials from the electrodes. Uncontrolled static offset electric fields from accumulated charge on insulating surfaces or contact potentials can give rise to radiofrequency micromotion and they can even destabilize the trap. Micromotion was suppressed along the direction of the Doppler cooling beam by applying static offset potentials to all of the electrodes that minimized both the broadening of the atomic fluorescence spectrum (e.g., half-width of ~50 MHz, to be compared with the natural half-width of 30 MHz) and the time-correlation of the atomic fluorescence with the radiofrequency trap drive frequency. Without this micromotion compensation, it would still be possible to trap the ion, but the ion lifetimes would be limited due to heating. Heating of the secular motion of the trapped ion was measured by performing optical stimulated Raman spectroscopy on the hyperfine qubit levels of the ion. As described below, and shown in FIG. 4a, a heating rate was extracted along the axial dimension of $(1.0\pm 0.5)\times 10^6$ quanta $s^{-1}$, at an axial trap frequency of 0.9 MHz.

Figure 4A:
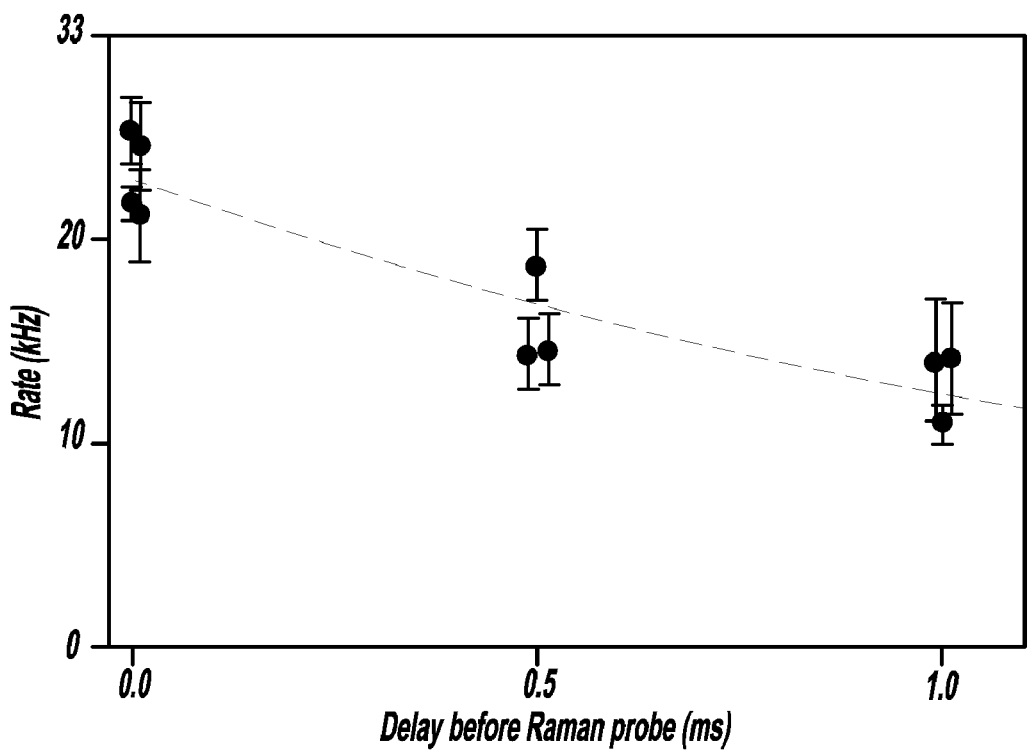
FIG. 4a is a graphical view of heating rate measurements of a single Cd+ ion in an ion trap wherein measurement of the motion-sensitive stimulated Raman transition rate between hyperfine states in 111Cd+ vs. the delay time $\tau=0, 0.5,$ and $1.0$ ms before the Raman probe (overlapping data are separated slightly for clarity), in accordance with a third alternative embodiment of the present invention.

Referring specifically to FIG. 4a, there is shown a graphical view of heating rate measurements of a single Cd+ ion in the microtrap wherein measurement of the motion-sensitive stimulated Raman transition rate between hyperfine states in 111Cd+ vs. the delay time τ=0, 0.5, and 1.0 ms before the Raman probe (overlapping data are separated slightly for clarity). The curve is an exponential fit to the data, with the decay constant related to the heating rate. Given the Lamb-Dicke parameter of 0.018 and trap frequency of 0.9 MHz, this implies a heating rate of $\bar{n}=(1.0\pm 0.5)\times 10^6$ $s^{-1}$, where $\bar{n}$ is the average harmonic vibrational index. The error in the heating rate is dominated by systematic uncertainties in relating the Raman transition rate to the heating rate, in addition to the ±1σ error bars shown in the figure, which are due to the uncertainty in the fit of the initial Raman transition data.

From this, a resonant electric field noise level was inferred of about $2.0\times 10^{-8}$ $(V/m)^2/Hz$. This is in the range of what might be expected on the basis of previous experimental Cd+ ion trap structures, assuming a $1/d^4$ scaling of the noise field with distance d between the ion and the nearest electrode, and is roughly three orders of magnitude larger than the expected level of thermal electric field noise from the resistive electrodes. The source of the observed heating is unknown, but may be related to fluctuating "patch" potentials on the electrode surfaces. Without being bound to a particular theory of the operation of the present invention, it is believed that the interaction between the ion and driven mechanical motion of the cantilevers may also play a role.

In order to reliably load, store, and shuttle ions, a microscale trap must have sufficient depth, defined as the amount of energy needed for an ion to escape. Numerical simulations indicate that the trap depth was approximately Δ~0.08 eV for the above conditions, limited in a direction inclined by ~37° out of the plane of the chip. This relatively shallow depth (i.e., the amount of energy required for an ion to escape from the trap), of order room temperature (e.g., 0.025 eV), corroborates further observations of the chip trap behavior, i.e., the mean storage time of 10 minutes was consistent with the expected time between elastic collisions with the room-temperature background gas (e.g., primarily Cd), and it was never possible to load two ions in the trap simultaneously. Without continuous Doppler cooling, the ion was observed to boil out of the trap within the dark delay time, where the delay time τ=0.1 s (e.g., see FIG. 4b), implying an average heating rate Δ/τ that is approximately 100 times higher than the heating rate measured near the bottom of the trap reported above. Thus, Doppler cooling appears to be necessary to sustain ion lifetimes longer than about 0.1 seconds.

Figure 4B:
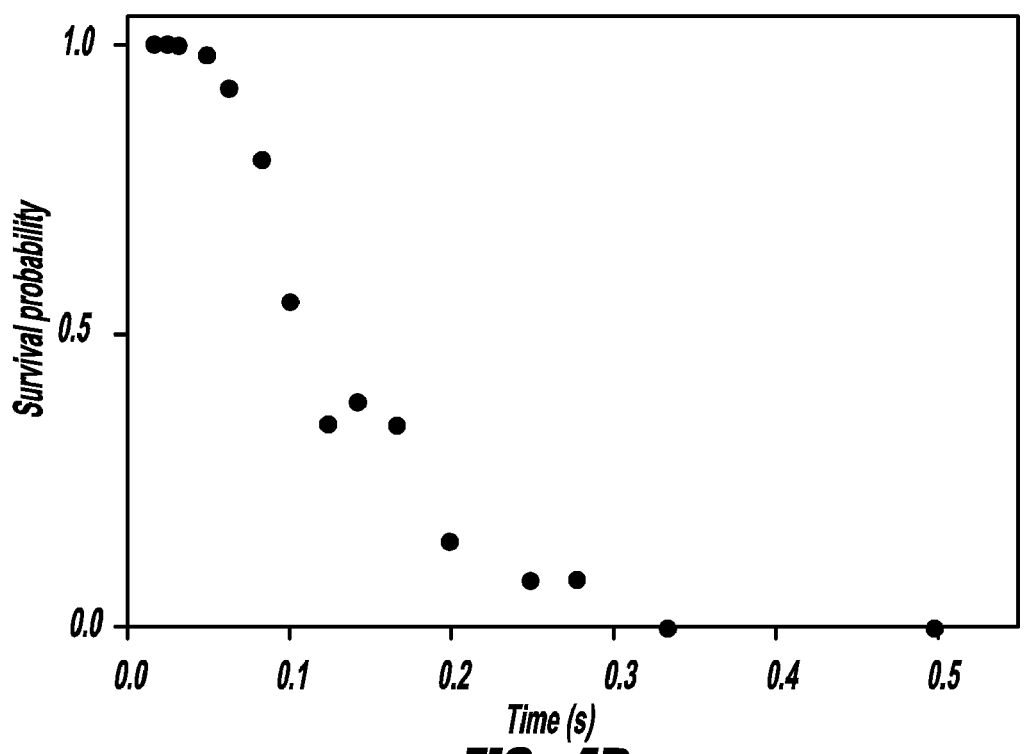
FIG. 4b is a graphical view of a histogram of the observed survival probability of a single ion in an ion trap after various times in the dark without Doppler cooling (e.g., 500 events total), in accordance with a fourth alternative embodiment of the present invention.

Referring specifically to FIG. 4b, there is shown a graphical view of a histogram of the observed survival probability of a single ion in the trap after various times in the dark without Doppler cooling (e.g., 500 events total). Errors were calculated based on the underlying Bernoulli sampling process. The clear knee in the data indicated that the ion is boiled out of the trap after about 0.1 s.

All of these observations contrasted sharply with the behavior of larger (mm scale) experimental Cd+ trap structures with depths >1 eV and similar background pressures, where the storage lifetime was typically measured in days (even without laser-cooling), and multiple ions were easily loaded.

The transverse depth of a linear radiofrequency ion trap scaled as $D=\sigma qeV_0/8$, where q was the stability factor, e was the charge of the ion and $\sigma \leq 1$ was a geometrical shape factor. If it is assumed that the radiofrequency potential amplitude was limited by $V_0 \propto E_{max} 1$, with $E_{max}$ the maximum electric field (given by electrical breakdown, field emission, or other limits), and 1 was the limiting dimension of the trap electrodes, then the trap depth scaled as $D \propto 1$. In this scaling law, we assumed q was fixed, and all dimensions were scaled isotropically ($\sigma$=constant). However, in the symmetric high-aspect ratio geometry, any reduction in size will primarily be in the plane of the chip (shrinking dimensions s and w in FIG. 1d, but not the layer separation h). In this case, the depth $D=\sigma(s)qeE_{max}h/8$ should actually improve as s becomes smaller through the geometrical shape factor $\sigma(s) \propto s^{-0.44}$ (e.g., for aspect ratios 1<s/h<20).

Another concern in the operation of ion microtraps was radiofrequency power dissipation, which limits the applied $V_0$ and $\Omega_T$. In general, the power dissipated in a radiofrequency ion trap was given by $PD=V_0^2 C\Omega_T/(2Q)$, where the quality factor Q describes the radiofrequency losses in the trap structure and was given by $1/Q=R_S C\Omega_T+\tan \delta$. Here, C was the net capacitance and $R_S$ was the net series resistance of the radiofrequency electrodes, and tan δ was the loss tangent of the insulating layer. In one experiment, Q~55 was measured from the radiofrequency resonance shape. This was consistent with a direct electrical measurement of the resistance between the base and the tip of a single electrode cantilever of 20Ω (corresponding to $R_S$~5Ω), a measurement of C~34 pF, and a negligible loss tangent. For the radiofrequency amplitude and frequency listed above, the power dissipated in the ion trap was expected to be about 2 mW, or 0.5 mW per electrode cantilever pair. As the geometry is scaled down in the chip plane (fixing h, q, and $V_0$ as above), it was expected that the dissipated power per unit area of radiofrequency electrode should grow as $I_0 \propto^{-22}$ (e.g., for aspect ratios 1<s/h<20).

In addition to stable trapping of individual ions in each of the two trapping zones, ions were shuttled between zones by smoothly changing the voltages (e.g., using a National Instruments card for voltage output) from trapping in one region to trapping in the adjacent region ~150 μm away. This was accomplished by smoothly changing the applied potentials on the electrodes between two settings that confine the ion in two adjacent zones. This has been demonstrated starting in either trap zone with shuttle times as fast as 2.5 ms, with the speed limited by low-pass filters installed on the chip.

Given these promising results for the GaAs microtrap architecture, it is intended to fabricate different structures that will feature larger trap depths and may show lower heating rates by altering the electrode dimensions in the plane of the chip and increasing the separation between layers. Also to be considered is the fabrication of "cross" and "tee" junctions in the GaAs architecture for more advanced shuttling experiments, perhaps requiring three-layer geometry. This symmetric high aspect ratio geometry could also accommodate other materials such as silicon, which may allow higher voltages to be applied with less radiofrequency dissipation. Ultimately, a hybrid geometry combining the symmetric high-aspect-ratio and asymmetric planar trap geometries might be considered. Here, the deeper symmetric cantilevered electrode zones might be used for loading and entangling zones where high trap strength and depth are required, and the planar trap zones might be used for complex shuttling operations.

By way of a non-limiting example, an illustrative method of fabricating the ion trap semiconductor chips of the present invention will now be described.

The wafer (e.g., see FIGS. 1a-f) consisted of a doped substrate on top of which are four layers grown by molecular beam epitaxy. Directly above the substrate was a 4 μm layer of $Al_{0.7}Ga_{0.3}As$, chosen for its insulating properties and selective etching versus GaAs. On top of it was a 2.3 μm layer of silicon-doped ($3 \times 10^{18}$ e/cm³) GaAs, 4 μm of $Al_{0.7}Ga_{0.3}As$ and 2.3 μm of doped GaAs. As shown in FIGS. 1a-f, a series of dry and wet etch procedures, e.g., as previously described, defined the cantilevered GaAs electrodes. The final step undercut the $Al_{0.7}Ga_{0.3}As$ from the edges of the GaAs cantilever by about 15 μm to shield the trapped ion from the exposed insulator. FIGS. 2a-b show scanning electron micrographs of the final structure.

The GaAs ion-trap chip was attached to a ceramic chip carrier using ceramic paste and 25-μm-diameter gold wires, wirebonded using a K&S wirebonder, were attached from the bond pads on the trap to the chip carrier, with a single wire connecting radiofrequency electrodes and individual wires going from the static-electrode bond pads to the chip carrier electrodes. The static electrodes were shunted to ground through 1,000 picofarad (pF) surface mount capacitors attached to the chip carrier, and measurements showed that the induced radiofrequency potential on the static electrodes was reduced to less than 1% of the applied radiofrequency potential. The chip carrier was then plugged into an ultra-high-vacuum-compatible socket made from DuPont Vespel SP-3 that was permanently connected in the vacuum chamber using fabricated mounting brackets and DuPont Kapton insulated wires. This arrangement allowed for fast turnaround time; i.e., replacing an ion trap does not involve changing any other components inside the vacuum chamber.

The RF delivery and breakdown will now be described. Radiofrequency potentials were applied to the trap using a fabricated helical resonator of unloaded quality factor $Q \approx 500$ and self-resonant frequency of 54.9 MHz. When a capacitive coupler was impedance matched to the resonator-trap system, the resonant frequency fell to 15.9 MHz, and the unloaded quality factor of the system dropped to 50. Without being bound to a particular theory of the operation of the present invention, it is believed that the breakdown of the AlGaAs layer appears to limit the amount of radiofrequency voltage that can be applied to the trap. A static potential as high as ~70V has been applied between the top and bottom cantilevers on a separate trap sample without breakdown, and a radiofrequency potential amplitude as high as $V_0=11$ V at 14.75 MHz before breakdown. Also observed was nonlinear current-voltage behavior across the GaAs electrodes, where the measured current depended upon the polarity of the applied voltage and even the level of room lights at particular voltages. However, none of these effects were measurable at applied potentials below ~40 V and are thus not expected to play a role in the operation of the ion trap of the present invention.

The measurement of heating using Raman spectroscopy will now be described. Heating of the secular harmonic motion of the trapped ion was measured by driving motion-sensitive stimulated Raman transitions between hyperfine ground states in the 111Cd+ ion. A pair of laser beams, each detuned ~70 GHz from the $^2S_{1/2}$-$^2P_{3/2}$ transition, was directed onto the ion, with an optical beatnote near the 14.53 GHz atomic hyperfine splitting. The two Raman beams had a 7° angular separation; with the wavevector difference oriented 45° from the axis of the trap (axial Lamb-Dicke parameter of $\eta \approx 0.018$ for a trap frequency of 0.9 MHz). By adding varying delays $\tau$ after Doppler cooling but before the Raman probe, the increase of motional energy of the ion was reflected by the suppression of the Raman carrier transition rate through the Debye-Waller effect. Assuming a thermal state of motion with average harmonic vibrational index $\bar{n}$, the transition rate was proportional to $e^{-\eta 2\bar{n}}$ in the Lamb-Dicke limit where $\eta 2\bar{n} \ll 1$. Here the Debye-Waller factor was neglected from the more tightly-confined transverse motion, expected to be negligible compared with that of axial motion. After the delay $\tau$, the Raman transition rate was measured by interrogating the hyperfine level of the ion after a time t of exposure to the Raman probe, and fitting the initial development of the transition probability as a quadratic in time: $P(t)=\sin^2(Rt/2) \sim (Rt/2)^2$. It was observed that the Raman carrier transition rate R decreased by approximately 25% after a delay of $\tau=0.5$ ms (with a negligible effect of heating on the rate during the 10 μs Raman probe), e.g., as shown in FIG. 4a. This corresponds to an axial heating rate of $\bar{n}=(1.0 \pm 0.5) \times 10^6 \text{ s}^{-1}$. The quoted error was dominated by the uncertainty in the absolute value of $\eta^{2\bar{n}(\tau)}$ that relates the Raman transition rate to the heating rate, in addition to the statistical uncertainty in the data.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An ion trap device, comprising:
   a semiconductor chip, including:
   a first substrate portion;
   a first insulator layer disposed on the first substrate portion;
   a first electrode layer disposed on the first insulator layer, wherein a first electrode system is formed on a surface thereof;
   a second substrate portion spaced and opposed to the first substrate portion so as to define a first aperture formed therebetween;
   a second insulator layer disposed on the second substrate portion spaced and opposed to the first insulator layer so as to define a second aperture formed therebetween;
   a second electrode layer disposed on the second insulator layer, wherein a second electrode system is formed on a surface thereof, wherein the second electrode layer is spaced and opposed to the first electrode layer so as to define a third aperture formed therebetween;
   a third insulator layer disposed on the first electrode layer;
   a third electrode layer disposed on the third insulator layer, wherein a third electrode system is formed on a surface thereof;
   a fourth insulator layer disposed on the second electrode layer spaced and opposed to the third insulator layer so as to define a fourth aperture formed therebetween; and
   a fourth electrode layer disposed on the fourth insulator layer, wherein a fourth electrode system is formed on a surface thereof, wherein the fourth electrode layer is spaced and opposed to the third electrode layer so as to define a fifth aperture formed therebetween;
   wherein the first, second, third, fourth, and fifth apertures are substantially axially aligned so as to define the at least one ion trapping region selectively operable to receive at least one ion introduced therein;
   wherein the first, second, third and fourth electrode systems are selectively operable to form the ion trap in the ion trapping region when a voltage is selectively applied to the first, second, third and fourth electrode systems.

2. The invention according to claim 1, wherein the first and second substrate portions each include an angled wedge portion extending from a bottom surface to a top surface thereof, wherein the angled wedge portions are spaced and opposed to one another.

3. The invention according to claim 1, wherein the first, second, third and fourth electrode layers are in a cantilevered arrangement with the first, second, third and fourth insulator layers, respectively, wherein the cantilevered arrangements are in proximity to the at least one ion trapping region.

4. The invention according to claim 1, wherein the first and third electrode layers are in a cantilevered arrangement with the first substrate portion and the second and fourth electrode layers are in a cantilevered arrangement with the second substrate portion, wherein the cantilevered arrangements are in proximity to the at least one ion trapping region.

5. The invention according to claim 1, wherein the first electrode layer, second electrode layer, third electrode layer, fourth electrode layer or the substrate are comprised of gallium arsenide.

6. The invention according to claim 1, wherein the first, second, third or fourth insulator layers are comprised of aluminum gallium arsenide.

7. The invention according to claim 1, wherein a portion of the first, second, third or fourth electrode systems are comprised of a material selected from the gold, nickel, germanium, and combinations thereof.

8. The invention according to claim 1, wherein a radiofrequency potential is applied to either the first, second, third or fourth electrode systems, wherein the radiofrequency potential is in the range of about 1 to about 50 volts at a drive frequency in the range of about 1 to about 50 megahertz.

9. The invention according to claim 1, wherein a static potential is applied to either the first, second, third or fourth electrode systems, wherein the static potential is in the range of about −10 to about +10 volts.

10. The invention according to claim 1, wherein the at least one ion is loaded into the at least one ion trapping region by photoionization laser pulsing.

11. The invention according to claim 10, wherein the at least one ion loaded into the at least one ion trapping region is Doppler laser cooled.

12. The invention according to claim 1, wherein the third aperture formed between an end portion of the first electrode layer and an end portion of the second electrode layer has a length of about 10 to about 100 μm, and wherein the fifth aperture formed between an end portion of the third electrode layer and an end portion of the fourth electrode layer has a length of about 10 to about 100 μm.

13. The invention according to claim 12, wherein the third and fifth apertures have an equidistant length.

14. The invention according to claim 1, wherein a radiofrequency potential is applied to either the first and fourth electrode systems or the second and third electrode systems, wherein the radiofrequency potential is in the range of about 1 to about 50 volts at a drive frequency in the range of about 1 to about 50 megahertz.

15. The invention according to claim 1, wherein a static potential is applied to either the first and fourth electrode layers or the second and third electrode layers, wherein the static potential is in the range of about −10 to about +10 volts.

16. The invention according to claim 1, wherein a radiofrequency potential is applied to the first and fourth electrode systems and a static potential is applied to the second and third electrode systems, wherein the radiofrequency potential is in the range of about 1 to about 50 volts at a drive frequency in the range of about 1 to about 200 megahertz, wherein the static potential is in the range of about −10 to about +10 volts.

17. The invention according to claim 1, wherein a radiofrequency potential is applied to the second and third electrode systems and a static potential is applied to the first and fourth electrode systems, wherein the radiofrequency potential is in the range of about 1 to about 50 volts at a drive frequency in the range of about 1 to about 200 megahertz, wherein the static potential is in the range of about −10 to about +10 volts.

18. The invention according to claim 1, wherein the ion trap device is operably associated with a quantum computer.

19. A method of making an ion trap device, comprising:
providing a substrate layer comprised of a conductive material;
disposing a first insulator layer on the substrate layer;
disposing a first membrane layer comprised of a conductive material on the first insulator layer;
disposing a second insulator layer on the first membrane layer;
disposing a second membrane layer on the second insulator layer;
back etching a bottom surface of the substrate layer to form a wedge portion defining a first substrate portion and a second spaced and opposed substrate portion, wherein a portion of a lower surface of the first insulator layer is exposed;
plasma etching a top surface of the second membrane layer to expose a portion of the first membrane layer;
plasma etching a portion of the first and second membrane layers and first and second insulator layers to expose a top surface of the substrate layer;
disposing an electrical contact member on spaced and opposed locations of the first and second membrane layers and the substrate layer;
plasma etching through an axis of the first and second membrane layers and the first and second insulator layers to define first, second, third and fourth membrane portions and first, second, third and fourth insulator portions, wherein an area defining a second aperture is formed between spaced and opposed first and second insulator portions, wherein an area defining a third aperture is formed between spaced and opposed first and second membrane portions; wherein an area defining a fourth aperture is formed between spaced and opposed third and fourth insulator portions, and wherein an area defining a fifth aperture is formed between spaced and opposed third and fourth membrane portions; and
acid etching end portions of the first, second, third and fourth insulator portions such that the first, second, third and fourth membrane layers, respectively, are in a cantilever arrangement therewith.

20. The invention according to claim 19, wherein the first, second, third, fourth, and fifth apertures are substantially axially aligned so as to define the at least one ion trapping region selectively operable to receive at least one ion introduced therein.

21. The invention according to claim 20, wherein the first, second, third and fourth membrane portions are selectively operable to form the ion trap in the ion trapping region when a voltage is applied to the first, second, third and fourth membrane portions.

22. The invention according to claim 20, wherein the first and third membrane portions are in a cantilevered arrangement with the first substrate portion and the second and fourth membrane portions are in a cantilevered arrangement with the second substrate portion, wherein the cantilevered arrangements are in proximity to the at least one ion trapping region.

23. The invention according to claim 19, wherein the first and second substrate portions each include an angled wedge portion extending from a bottom surface to a top surface thereof, wherein the angled wedge portions are spaced and opposed to one another.

24. The invention according to claim 19, wherein the first membrane layer, second membrane layer, or the substrate are comprised of gallium arsenide.

25. The invention according to claim 19, wherein the first or second insulator layers are comprised of aluminum gallium arsenide.

26. The invention according to claim 19, wherein the electrical contact member is comprised of a material selected from the gold, nickel, germanium, and combinations thereof.

27. The invention according to claim 19, wherein a radiofrequency potential is applied to either the first, second, third or fourth membrane portions, wherein the radiofrequency potential is in the range of about 1 to about 50 volts at a drive frequency in the range of about 1 to about 200 megahertz.

28. The invention according to claim 19, wherein a static potential is applied to either the first, second, third or fourth membrane portions, wherein the static potential is in the range of about −10 to about +10 volts.

29. The invention according to claim 19, wherein the at least one ion is loaded into the at least one ion trapping region by photoionization laser pulsing.

30. The invention according to claim 29, wherein the at least one ion loaded into the at least one ion trapping region is Doppler laser cooled.

31. The invention according to claim 19, wherein the third aperture formed between an end portion of the first membrane portion and an end portion of the second membrane portion has a length of about 10 to about 100 μm, and wherein the fifth aperture formed between an end portion of the third membrane portion and an end portion of the fourth membrane portion has a length of about 10 to about 100 μm.

32. The invention according to claim 31, wherein the third and fifth apertures have an equidistant length.

33. The invention according to claim 19, wherein a radiofrequency potential is applied to either the first and fourth membrane portions or the second and third membrane portions, wherein the radiofrequency potential is in the range of about 1 to about 200 volts at a drive frequency in the range of about 1 to about 200 megahertz.

34. The invention according to claim 19, wherein a static potential is applied to either the first and fourth membrane portions or the second and third membrane portions, wherein the static potential is in the range of about −10 to about +10 volts.

35. The invention according to claim 19, wherein a radiofrequency potential is applied to the first and fourth membrane portions and a static potential is applied to the second and third membrane portions, wherein the radiofrequency potential is in the range of about 1 to about 50 volts at a drive frequency in the range of about 1 to about 200 megahertz, wherein the static potential is in the range of about −10 to about +10 volts.

36. The invention according to claim 19, wherein a radiofrequency potential is applied to the second and third membrane portions and a static potential is applied to the first and fourth membrane portions, wherein the radiofrequency potential is in the range of about 1 to about 50 volts at a drive frequency in the range of about 1 to about 200 megahertz, wherein the static potential is in the range of about −10 to about +10 volts.

37. The invention according to claim 19, wherein the ion trap device is operably associated with a quantum computer.

38. A semiconductor-chip-based ion trap device for trapping at least one ion, comprising:
 a first electrode assembly having at least three segmented cantilevered electrodes, with each cantilevered electrode segment having stacked upper and lower electrode members spaced apart by an insulating layer, with each electrode member having a proximate end with a contact pad and a distal end; and
 a second electrode assembly identical or substantially identical to the first electrode assembly and arranged in opposition thereto with the electrode distal ends in proximity to one another to form a gap that defines a free-space ion-trap region wherein the at least one ion is trapped when an electrical potential is applied to the first and second electrode assemblies.

39. The ion trap device of claim 38, wherein the electrical potential includes a static electrical potential and an oscillating electrical potential.

40. The ion trap device of claim 38, wherein the oscillating electrical potential is applied to the upper electrodes in one of the electrode assemblies and to the lower electrodes of the other electrode assembly.

41. The ion trap device of claim 39, wherein the electric potential includes a radiofrequency potential in the range from about 1 volt to about 50 volts at a drive frequency in the range from about 1 MHz to about 200 MHz.

42. The ion trap device of claim 41, wherein the electric potential includes a static potential in the range from about −10 volts to about +10 volts.

43. The ion trap device of claim 42, wherein the separation between electrode members in the first and second electrode assemblies that forms said gap is in the range from about 20 μm to about 100 μm.

44. The ion trap device of claim 38, wherein adjacent electrode segments are separated by a distance in the range from about 5 μm to about 40 μm.

45. The ion trap device of claim 44, wherein each electrode segment has a width in the range from about 40 μm to about 300 μm.

46. The ion trap device of claim 38, wherein the upper and lower electrodes are spaced apart by a distance in the range from about 1 μm to about 20 μm.

47. The ion trap device of claim 38, wherein the electrode members are formed from GaAs and the insulating layers separating the electrode members are formed from AlGaAs.

48. The ion trap device of claim 38, wherein the upper and lower electrodes have a thickness in the range from about 1 μm to about 10 μm.

49. The ion trap device of claim 38, wherein the first and second opposing electrode assemblies are supported by a respective first and second doped semiconductor substrate segments.

50. The ion trap device of claim 38, wherein each of the first and second opposing electrode assemblies has four segmented cantilevered electrodes.

51. The ion trap device of claim 38, wherein the ion trap region has one or more zones that trap the at least one ion, wherein the ion trap zones are defined by the number of electrode members in the first and second electrode assemblies, and wherein the at least one ion is moveable between the ion trap zones by adjusting the electrical potential.

52. The ion trap device of claim 51, wherein each ion trap zone is defined by three pairs of opposing electrode segments.

53. The ion trap device of claim 38, wherein the first and second electrode assemblies are formed from a monolithic semiconductor structure.

54. A method of trapping at least one ion, comprising:
 providing opposing first and second electrode assemblies, with each assembly having at least three segmented cantilevered electrodes, with each cantilevered electrode segment having stacked upper and lower electrode members spaced apart by an insulating layer, with each electrode member having a proximate end with a contact pad and a distal end, with the first and second assemblies arranged in opposition with the electrode distal ends in proximity to one another to form a gap that defines a free-space ion-trap region wherein the at least one ion is trapped when an electrical potential is applied to the first and second electrode assemblies;
 introducing the at least one ion into the ion-trap region; and
 applying said electrical potential so as to trap the at least one ion in the ion-trap region.

55. The method of claim 54, further comprising:
 forming the first and second electrode assemblies from a monolithic semiconductor structure.

56. The method of claim 54, wherein said introducing of the at least one ion into the ion-trap region includes performing photo-ionization of atoms to form ions, and laser cooling at least one of the ions.

57. The method of claim 54, wherein applying said electrical potential includes applying a static electric potential to some of the electrode members and an oscillating electrical potential to at least some of the other electrode members.

58. The method of claim 54, wherein the ion-trap region includes two or more zones, and including moving the at least one ion between the two or more zones by varying the electrical potential.

59. The method of claim 54, including forming electrode members from GaAs and forming the insulating layers separating the electrode members from AlGaAs.

60. A method of fabricating an ion trap device for trapping at least one ion, comprising:
forming a first electrode assembly having at least three segmented cantilevered electrodes, including providing each cantilevered electrode segment with stacked upper and lower electrode members spaced apart by an insulating layer, with each electrode member having a proximate end with a contact pad and a distal end; and
forming a second electrode assembly identical or substantially identical to the
first electrode assembly so as to be arranged in opposition thereto with the electrode distal ends in proximity to one another to form a gap that defines a free-space ion-trap region wherein the at least one ion is trapped when an electrical potential is applied to the first and second electrode assemblies.

61. The method of claim 60, including forming the first and second electrode assemblies from a monolithic semiconductor structure having alternating insulating and conductive layers.

62. The method of claim 61, including forming the insulating layers from AlGaAs and forming the conducting layers from GaAs.

63. The method of claim 59, including supporting the first and second opposing electrode assemblies with respective first and second doped semiconductor substrate segments.

64. The method of claim 62, including performing plasma etching of the monolithic semiconductor structure in forming the first and second electrode assemblies.

65. The method of claim 64, including performing acid etching of the monolithic semiconductor structure in forming the first and second electrode assemblies.

66. The method of claim 59, including connecting the electrodes to an electrical source adapted to provide said electrical potential to the first and second electrode assemblies.

67. The method of claim 59, further including one or more of the steps of:
forming the separation between electrode members in the first and second electrode assemblies that forms said gap to be in the range from about 20 μm to about 100 μm;
forming the adjacent electrode segments so that they are separated by a distance in the range from about 5 μm to about 40 μm;
forming each electrode segment to have a width in the range from about 40 μm to about 300 μm;
forming the upper and lower electrodes so as to be are spaced apart by a distance in the range from about 1 μm to about 20 μm; and forming the upper and lower electrodes to have a thickness in the range from about 1 μm to about 10 μm.

* * * * *

UNITED STATES PATENT AND TRADEMARK OFFICE
CERTIFICATE OF CORRECTION

PATENT NO. : 7,411,187 B2  Page 1 of 1
APPLICATION NO. : 11/419955
DATED : August 12, 2008
INVENTOR(S) : Christopher Monroe et al.

It is certified that error appears in the above-identified patent and that said Letters Patent is hereby corrected as shown below:

On the title page, item [75]:
Inventors: delete "Winfried Hensinger, Ann Arbor, MI" and replace with --Winfried Hensinger, Houe, United Kingdom--.

Column 16, line 67, delete "1 to about 50 megahertz" and replace with --1 to about 200 megahertz--.

Column 19 line 12, delete "1 to about 200 volts" and replace with --1 to about 50 volts--.

Signed and Sealed this

Fourth Day of November, 2008

JON W. DUDAS
*Director of the United States Patent and Trademark Office*